US012516783B1

(12) United States Patent
Lin

(10) Patent No.: US 12,516,783 B1
(45) Date of Patent: Jan. 6, 2026

(54) LED LAMP

(71) Applicant: DONGGUAN KAIYU PHOTOELECTRIC TECHNOLOGY CO., LTD, Dongguan (CN)

(72) Inventor: Shikai Lin, Dongguan (CN)

(73) Assignee: DONGGUAN KAIYU PHOTOELECTRIC TECHNOLOGY CO., LTD, Dongguan (CN)

(*) Notice: Subject to any disclaimer, the term of this patent is extended or adjusted under 35 U.S.C. 154(b) by 0 days.

(21) Appl. No.: 19/094,773

(22) Filed: Mar. 28, 2025

(30) Foreign Application Priority Data

Jan. 8, 2025 (CN) ......................... 202520045757.6
Jan. 22, 2025 (CN) ......................... 202520157577.7

(51) Int. Cl.

| | |
|---|---|
| ***F21K 9/238*** | (2016.01) |
| ***F21K 9/232*** | (2016.01) |
| ***F21V 19/00*** | (2006.01) |
| ***F21V 19/04*** | (2006.01) |
| ***F21V 29/503*** | (2015.01) |
| ***F21V 29/83*** | (2015.01) |
| *F21K 9/66* | (2016.01) |
| *F21Y 115/10* | (2016.01) |

(52) U.S. Cl.
CPC .............. *F21K 9/238* (2016.08); *F21K 9/232* (2016.08); *F21V 19/0035* (2013.01); *F21V 19/04* (2013.01); *F21V 29/503* (2015.01); *F21V 29/83* (2015.01); *F21K 9/66* (2016.08); *F21Y 2115/10* (2016.08)

(58) Field of Classification Search
CPC . F21K 9/238; F21K 9/232; F21K 9/66; F21V 29/503; F21V 29/83; F21V 19/0035; F21V 19/04; F21Y 2115/10
See application file for complete search history.

(56) References Cited

U.S. PATENT DOCUMENTS

| | | | | |
|---|---|---|---|---|
| 12,007,078 | B2 * | 6/2024 | Li | F21K 9/238 |
| 2018/0156445 | A1 * | 6/2018 | Chen | F21V 29/85 |
| 2024/0142066 | A1 * | 5/2024 | Li | F21V 19/0005 |

FOREIGN PATENT DOCUMENTS

CN 110425434 A 11/2019

* cited by examiner

*Primary Examiner* — Bao Q Truong
(74) *Attorney, Agent, or Firm* — Birchwood IP

(57) ABSTRACT

The invention discloses an improved novel LED lamp, which comprises a lampshade, an LED filament, a lamp cap and a positioning seat; the LED filament comprises a substrate, an LED light source, a packaging layer, two conductive parts, two conductive filaments and a display positioning block; the middle and upper ends of the two conductive filaments and the lower ends of the substrate and the two conductive parts are covered by the injection-molded display positioning block. The display positioning block of the invention is used to cover the middle and upper ends of the conductive filaments to prevent the conductive filaments from being deformed and bent.

20 Claims, 10 Drawing Sheets

LED LAMP

CROSS-REFERENCE TO RELATED APPLICATIONS

This application claims priority to Chinese Patent Application No. 202520045757.6, filed on Jan. 8, 2025 and No. 202520157577.7, filed on Jan. 22, 2025, which is hereby incorporated by reference in its entirety.

TECHNICAL FIELD

The invention relates to the technical field of LED lamps, in particular to an improved novel LED lamp.

BACKGROUND

In recent years, due to the rapid development of the LED industry, LED bulbs have gradually replaced traditional lighting fixtures. Additionally, as a cold light source, LED bulbs have been widely used in daily life.

The application publication number CN110425434A discloses a plastic LED filament bulb and a production method thereof. Specifically, the plastic LED filament bulb comprises a lampshade, a lamp cap and a plastic core, a plug-in connecting section is arranged at the lower end of the lampshade, the plastic core comprises an injection-molded rubber plug matched with the inner diameter of the plug-in connecting section, a first conductive filament, a second conductive filament with a resistive driving element and an LED filament, both ends of the LED filament are welded and fixed to the upper ends of the first conductive filament and the second conductive filament respectively, the middle part of the first conductive filament and the resistive driving element of the second conductive filament are automatically braided and then injection-molded to form the plastic core, and the plastic core is fixed inside the lampshade by inserting the injection-molded plug into the plug-in connecting section by interference fit.

However, the LED filament still has some problems. For example, although the middle part of the first conductive filament and the resistive driving element of the second conductive filament are injection-molded into the injection-molded rubber plug, the portion of the first and second conductive filaments between the top of the injection-molded rubber plug and the LED filament remains exposed, so that the exposed part of the conductive filaments is prone to bending or deformation during transportation due to vibration or gravity, affecting the normal operation of the bulb. In other words, the anti-deformation performance of the conductive filaments is still insufficient.

SUMMARY

To address the problems existing in the prior art, the invention aims to provide an improved LED lamp, featuring a display positioning block that fully packages both the middle and upper ends of the conductive filaments. The design not only ensures the stability of the conductive filaments covered by the display positioning block and prevents deformation or bending, but also facilitates use and transportation.

In order to realize the above purpose, the invention adopts the following technical proposal:

an improved novel LED lamp comprises a lampshade, an LED filament, a lamp cap and a positioning seat; the LED filament comprises a substrate, an LED light source, packaging layers, two conductive parts, two conductive filaments and a display positioning block; the LED light source is arranged on the surface of the substrate, and the packaging layers covered on the LED light source is arranged on both surfaces of the substrate; the two conductive parts are respectively arranged at the lower end of one surface of the substrate and electrically connected with the LED light source; the upper ends of the two conductive filaments are respectively connected with the two conductive parts; the middle and upper ends of the two conductive filaments and the lower ends of the substrate and the two conductive parts are covered by the injection-molded display positioning block, and the display positioning block is extended upward to a position near the bottom of the packaging layer, so that the middle and upper ends of the two conductive filaments are not easily bent and deformed, and the stability thereof is improved; the display positioning block can be used to prevent electric shock, and the upper end surface thereof can be used for printing patterns or logos; the positioning seat is installed in a perforating hole at the lower end of the lampshade; a positioning hole penetrating up and down is arranged in the middle of the positioning seat; the lower end of the display positioning block is clamped in the positioning hole in a matchable way to position the LED filament; the lower ends of the two conductive filaments pass down through the positioning holes; the lamp cap is sleeved outside the perforating hole at the lower end of the lampshade and is respectively connected with the lower ends of the two conductive filaments.

The invention also adopts the following technical proposal:

Further, the display positioning block comprises a protection part located at the top and a positioning part located at the bottom; the protection part and the positioning part are flat, and the thickness of the positioning part is greater than that of the protection part; the protection part can be used for clamping with a fixing part, and the bottom surface of the fixing part can be butted against the positioning part; the positioning part can be used for interference fit with the positioning hole, and the protection part can be used for printing patterns or logos. Through the above arrangement, each component can be easily positioned.

Further, the outer surfaces around the positioning part and the sides around the positioning hole are two planes and two arc-shaped surfaces connected successively at intervals, so that the connection between the positioning part and the positioning hole is very stable, and the positioning part does not easily rotate in the positioning hole.

Further, the positioning seat comprises a central part located in the middle and provided with the positioning hole in the center, a plurality of support strips radially connected on the outer surface around the central part and a baffle plate respectively connected with the outer ends of a plurality of support strips; heat dissipation holes penetrating up and down are formed between the two adjacent support strips. Through the above arrangement, the positioning seat can be connected with the display positioning block by using the central part, and the heat dissipation hole can improve the heat dissipation efficiency of the LED filament and then extend the service life of the LED filament to a certain extent.

Further, a first convex block for matching with the bottom surface of the lampshade is extended outward around the bottom of the baffle plate; the first convex block is affixed to the bottom surface of the lampshade when the positioning seat is installed in the perforating hole at the lower end of the lampshade in a matchable way. Through the above arrangement, the positioning seat can be limited by the first convex block during the installation process to prevent the positioning seat from exceeding the predetermined travel.

Further, a second convex block for matching with the bottom surface of the central part is extended outward around the bottom of the positioning part; the second convex block is affixed to the bottom surface of the central part when the positioning part is clamped in the positioning hole in a matchable way. Through the above arrangement, the display positioning block can be limited by the second convex block during installation to prevent the display positioning block from exceeding the predetermined travel.

Further, a plurality of uniformly distributed anti-slip raised strips are arranged on the outer surfaces around the positioning seat so that the positioning seat can be installed in the perforating hole at the lower end of the lampshade by interference fit. The above arrangement can ensure the connection stability between the positioning seat and the lampshade.

Further, an external thread surrounding the perforating hole is arranged around the lower end of the lampshade, and an internal thread corresponding to the external thread is arranged in the lamp cap, so that a threaded connection can be realized between the lamp cap and the lampshade.

Further, the improved novel LED lamp also comprises a resistor; the resistor is connected to one conductive filament and covered by the display positioning block.

The invention also provides an improved novel LED lamp, which comprises a lampshade, an LED filament, a lamp cap, a positioning seat and a decorative modeling part; the LED filament comprises a substrate, an LED light source, packaging layers, two conductive parts, two conductive filaments and a display positioning block; the LED light source is arranged on the surface of the substrate, and the packaging layers covered on the LED light source is arranged on both surfaces of the substrate; the two conductive parts are respectively arranged at the lower end of one surface of the substrate and electrically connected with the LED light source; the upper ends of the two conductive filaments are respectively connected with the two conductive parts; the middle and upper ends of the two conductive filaments and the lower ends of the substrate and the two conductive parts are covered by the injection-molded display positioning block, and the display positioning block is extended upward to a position near the bottom of the packaging layer, so that the middle and upper ends of the two conductive filaments are not easily bent and deformed, and the stability thereof is improved; and the display positioning block is extended upward to a position near the bottom of the packaging layer, so that the middle and upper ends of the two conductive filaments are not easily bent and deformed, and the stability thereof is improved; the display positioning block can be used to prevent electric shock, and the upper end surface thereof can be used for printing patterns or logos; the decorative modeling part comprises a decorative part and a fixing part successively connected; the fixing part can be installed on the display positioning block to position the decorative modeling part; the decorative part can be used to play a decorative role; the positioning seat is installed in a perforating hole at the lower end of the lampshade; a positioning hole penetrating up and down is arranged in the middle of the positioning seat; the lower end of the display positioning block is clamped in the positioning hole in a matchable way to position the LED filament; the lower ends of the two conductive filaments pass down through the positioning holes; the lamp cap is sleeved outside the perforating hole at the lower end of the lampshade and is respectively connected with the lower ends of the two conductive filaments.

Further, an inner cavity corresponding to the display positioning block is arranged inside the fixing part, and a penetrating opening is arranged at the lower end of the inner cavity, so that the fixing part can be sleeved on the display positioning block from top to bottom through the inner cavity, forming a clamping structure. The above arrangement can facilitate the installation of the decorative modeling part.

Further, an inner cavity corresponding to the display positioning block is arranged inside the fixing part, and an opening running through the upper and lower ends of the fixing part is arranged on one side of the inner cavity; the width of the opening is less than the width of the fixing part so as to form clamping slots respectively on two inner sides of the fixing part; the fixing part can be sleeved horizontally on the display positioning block through the opening, and both sides of the display positioning block are respectively clamped by the two clamping slots to form a clamping structure. The above arrangement can also facilitate the installation of the decorative modeling part.

Further, the display positioning block comprises a protection part located at the top and a positioning part located at the bottom; the protection part and the positioning part are flat, and the thickness of the positioning part is greater than that of the protection part; the protection part can be used for clamping with a fixing part, and the bottom surface of the fixing part can be butted against the positioning part; the positioning part can be used for interference fit with the positioning hole. Through the above arrangement, each component can be easily positioned.

Further, the outer surfaces around the positioning part and the sides around the positioning hole are two planes and two arc-shaped surfaces connected successively at intervals, so that the connection between the positioning part and the positioning hole is very stable, and the positioning part does not easily rotate in the positioning hole.

Further, the positioning seat comprises a central part located in the middle and provided with the positioning hole in the center, a plurality of support strips radially connected on the outer surface around the central part and a baffle plate respectively connected with the outer ends of a plurality of support strips; heat dissipation holes penetrating up and down are formed between the two adjacent support strips. Through the above arrangement, the positioning seat can be connected with the display positioning block by using the central part, and the heat dissipation hole can improve the heat dissipation efficiency of the LED filament and then extend the service life of the LED filament to a certain extent.

Further, a first convex block for matching with the bottom surface of the lampshade is extended outward around the bottom of the baffle plate; the first convex block is affixed to the bottom surface of the lampshade when the positioning seat is installed in the perforating hole at the lower end of the lampshade in a matchable way. Through the above arrangement, the positioning seat can be limited by the first convex block during the installation process to prevent the positioning seat from exceeding the predetermined travel.

Further, a second convex block for matching with the bottom surface of the central part is extended outward around the bottom of the positioning part; the second convex block is affixed to the bottom surface of the central part when the positioning part is clamped in the positioning hole in a matchable way. Through the above arrangement, the display positioning block can be limited by the second convex block during installation to prevent the display positioning block from exceeding the predetermined travel.

Further, a plurality of uniformly distributed anti-slip raised strips are arranged on the outer surfaces around the positioning seat so that the positioning seat can be installed in the perforating hole at the lower end of the lampshade by interference fit.

Further, the LED light source and the packaging layer pass through the decorative part or are located on one side of the decorative part to realize different installation methods of the decorative modeling part.

Further, the appearance of the decorative part can be animal, plant, number or English letter.

The invention has the following beneficial effects:

(1) In the invention, the display positioning block is extended upward to the position near the bottom of the packaging layer, so that the middle and upper ends of the conductive filaments can be completely covered, i.e., the conductive filaments cannot be exposed above the display positioning block as is the case with prior art. This design can ensure the stability of the conductive filaments covered by the display positioning block, prevent deformation and bending, and facilitate use and transport. Off course, the display positioning block also has the effect of preventing electric shock when people touch.

(2) In the invention, as the display positioning block of the LED filament is detachably installed in the positioning hole of the positioning seat, the LED filament or positioning seat can be replaced separately without affecting other components when damaged; moreover, when the lampshade with the perforating hole 11 of different size needs replacing, the user only needs to directly replace the positioning seat with different external diameter, but the size of the positioning hole on each positioning seat needs to be unchanged, i.e., the LED filament does not need replacing, so that the unreplaced LED filament can be continuously used on the new positioning seat. This design can reduce the replacement and use costs of the lamp to a certain extent.

(3) The upper end of the display positioning block in the invention can be used for printing corresponding patterns, such as logo or other markings, etc., in order to carry out brand promotion or improve aesthetics.

(4) In the invention, the decorative modeling part is also arranged on the display positioning block 24, so that the lamp can create different decorative effects in the production process by installing the decorative modeling parts 5 of different shapes, and then create different holiday atmospheres to meet the purchase needs of different groups of people. In addition, the decorative modeling part is also very convenient and quick to disassemble, and the use effect thereof is good.

REFERENCE SIGNS

Figure 1:
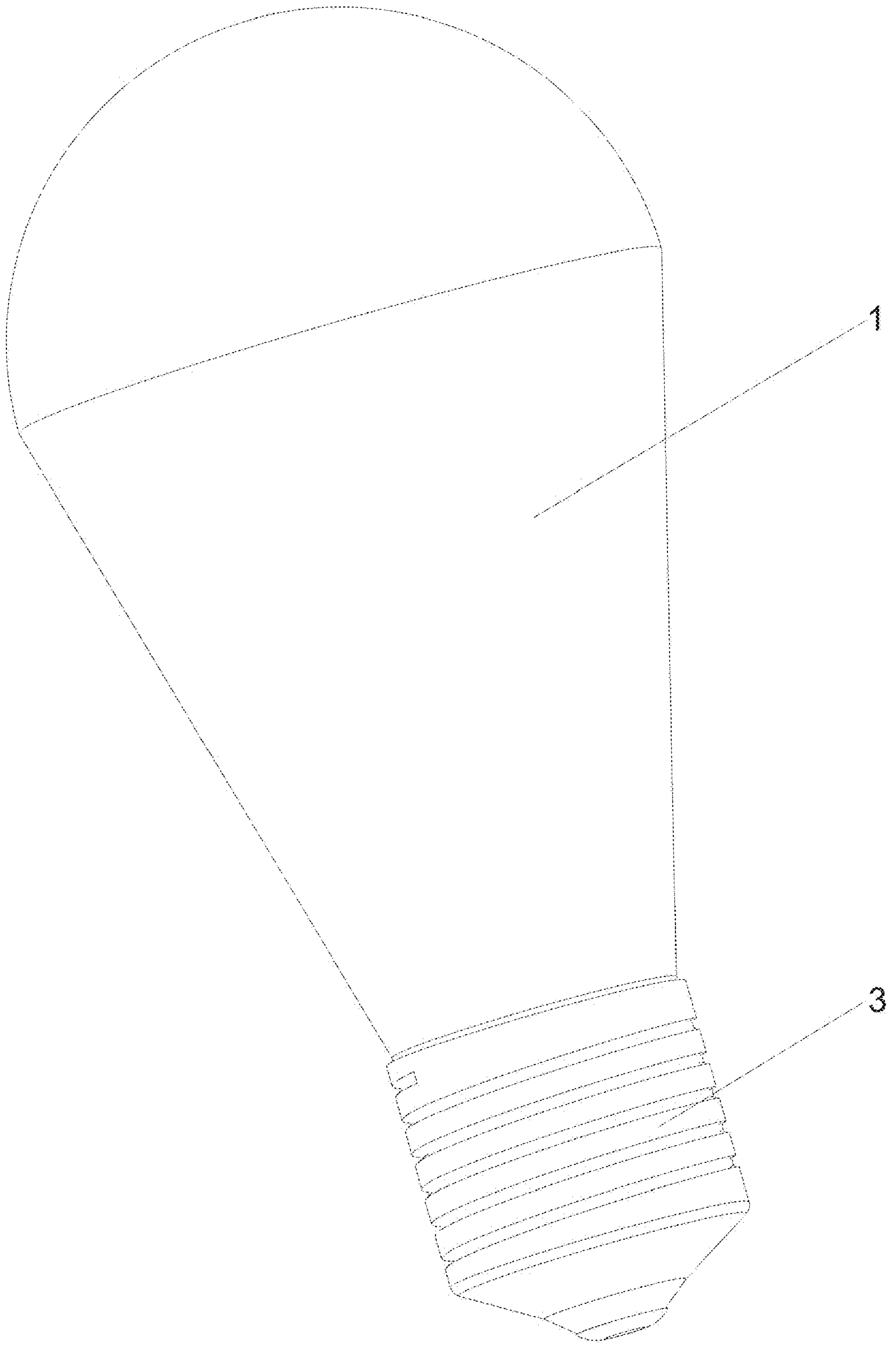
FIG. 1 is the schematic diagram for an overall structure of Embodiment 1 in the invention.
Figure 2:
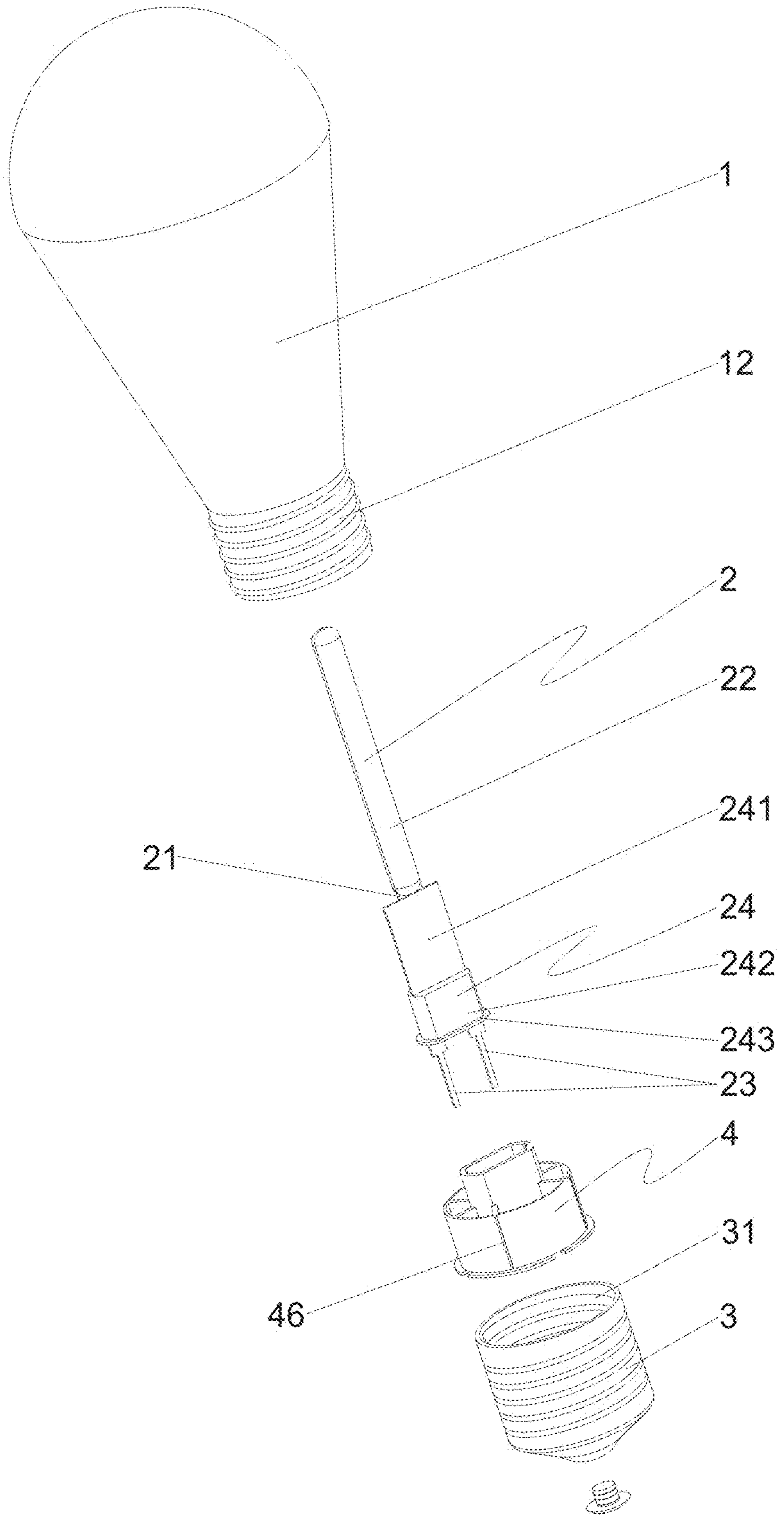
FIG. 2 is the explosive view 1 of Embodiment 1 in the invention.
Figure 3:
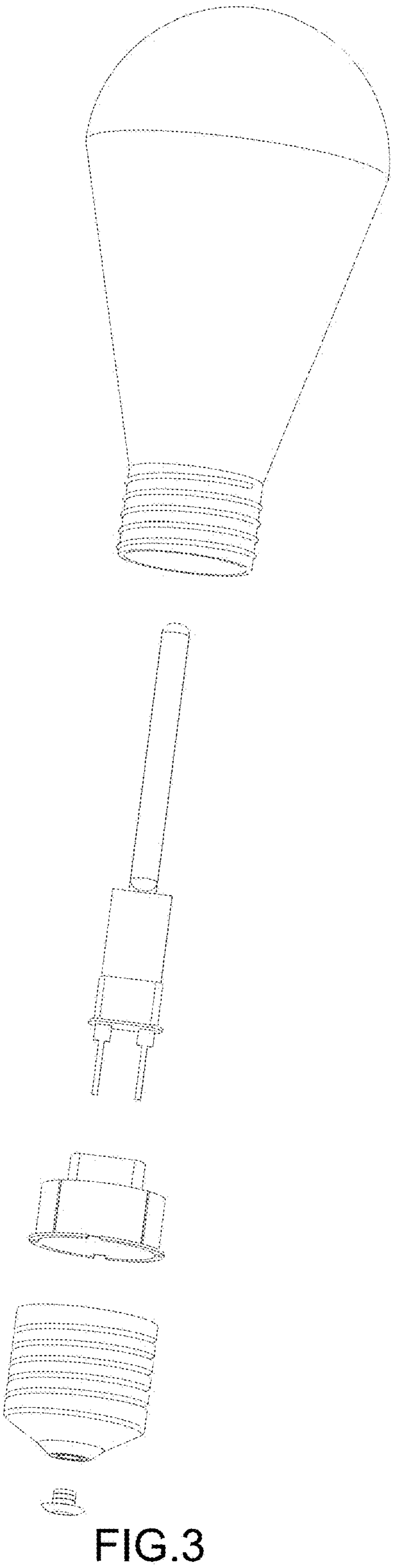
FIG. 3 is the explosive view 2 of Embodiment 1 in the invention.
Figure 4:
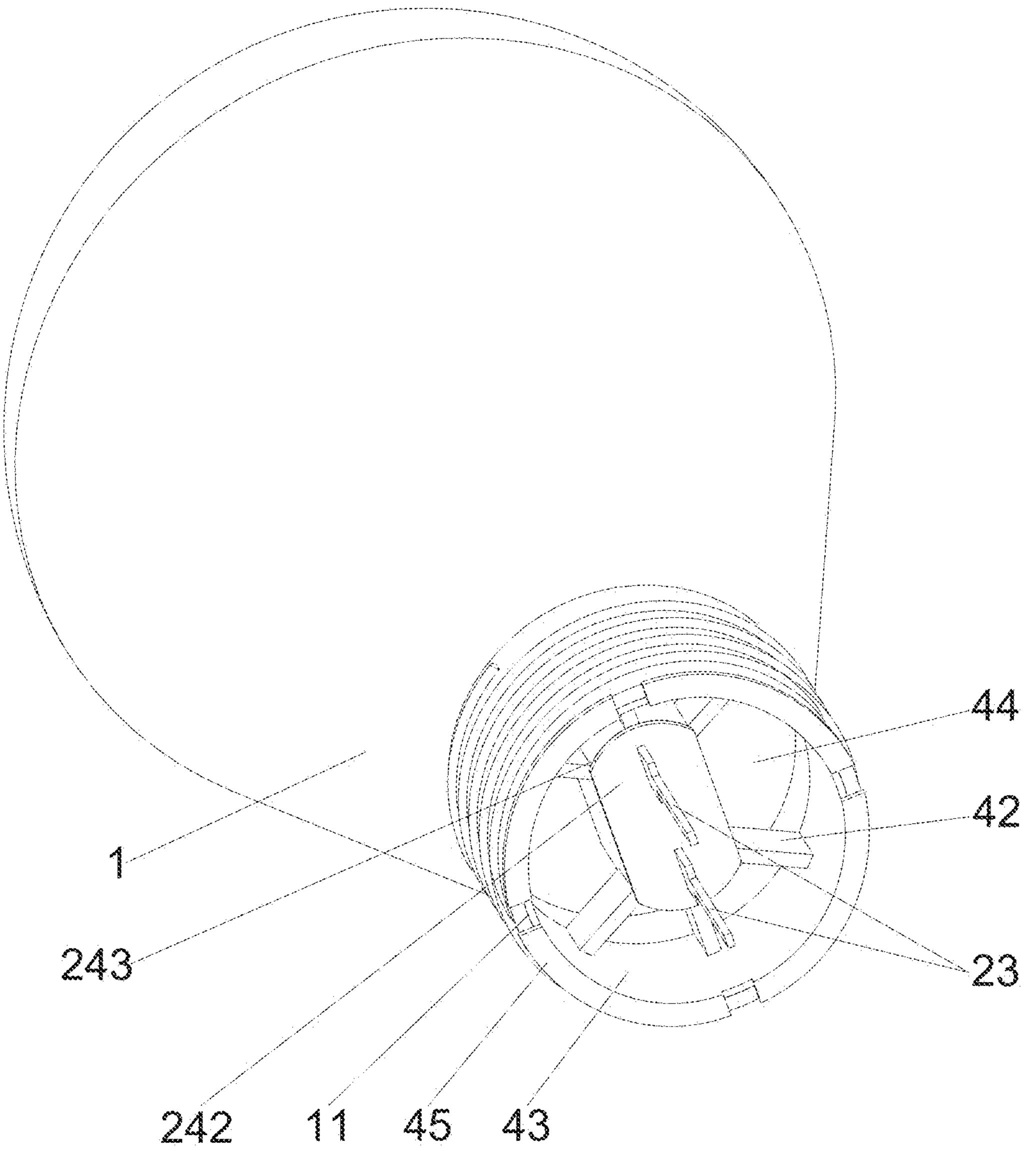
FIG. 4 is the structural diagram of Embodiment 1 in the invention with a lamp cap removed.
Figure 5:
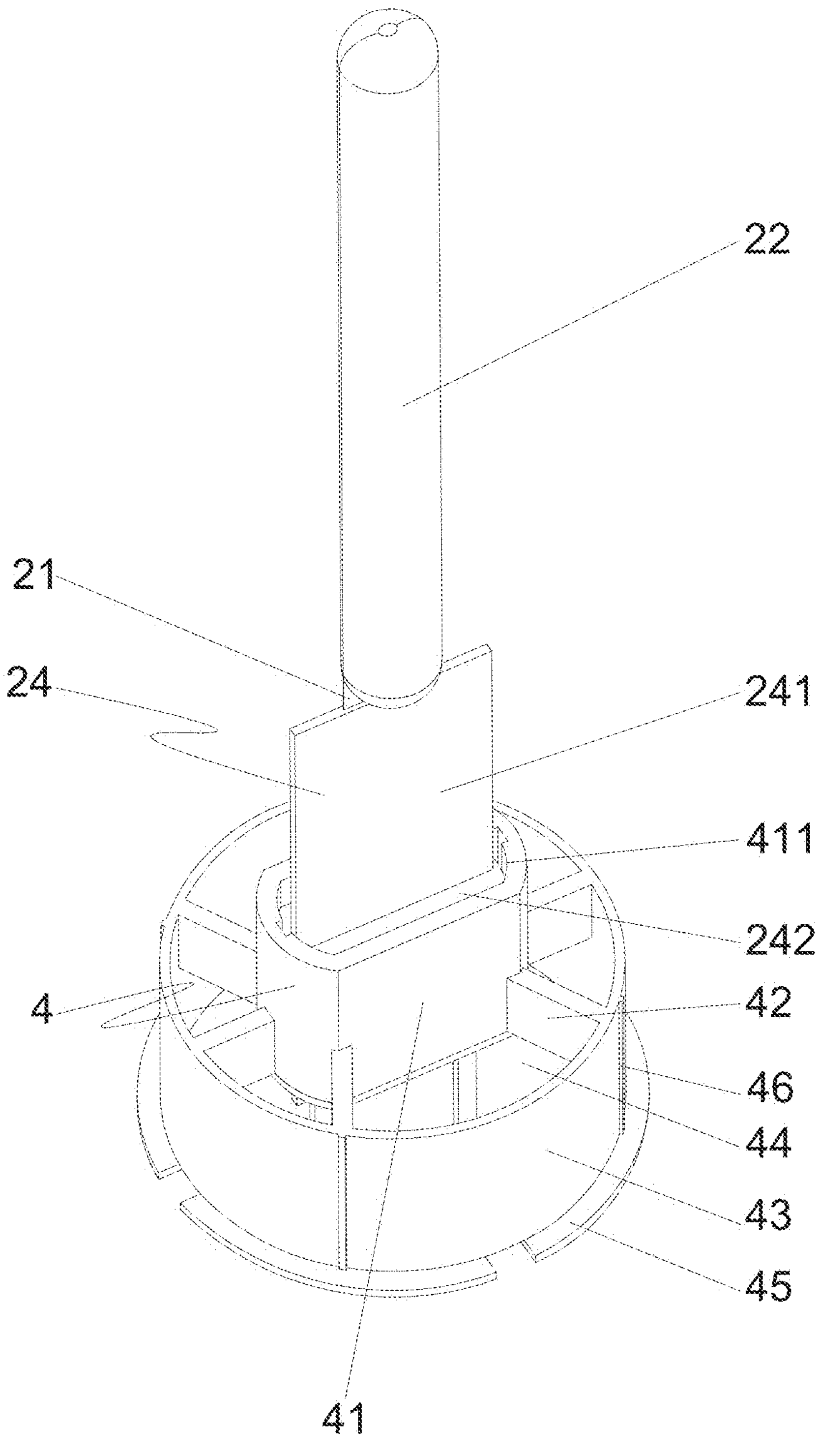
FIG. 5 is the structural diagram for a LED filament and a positioning seat of the invention.
Figure 6:
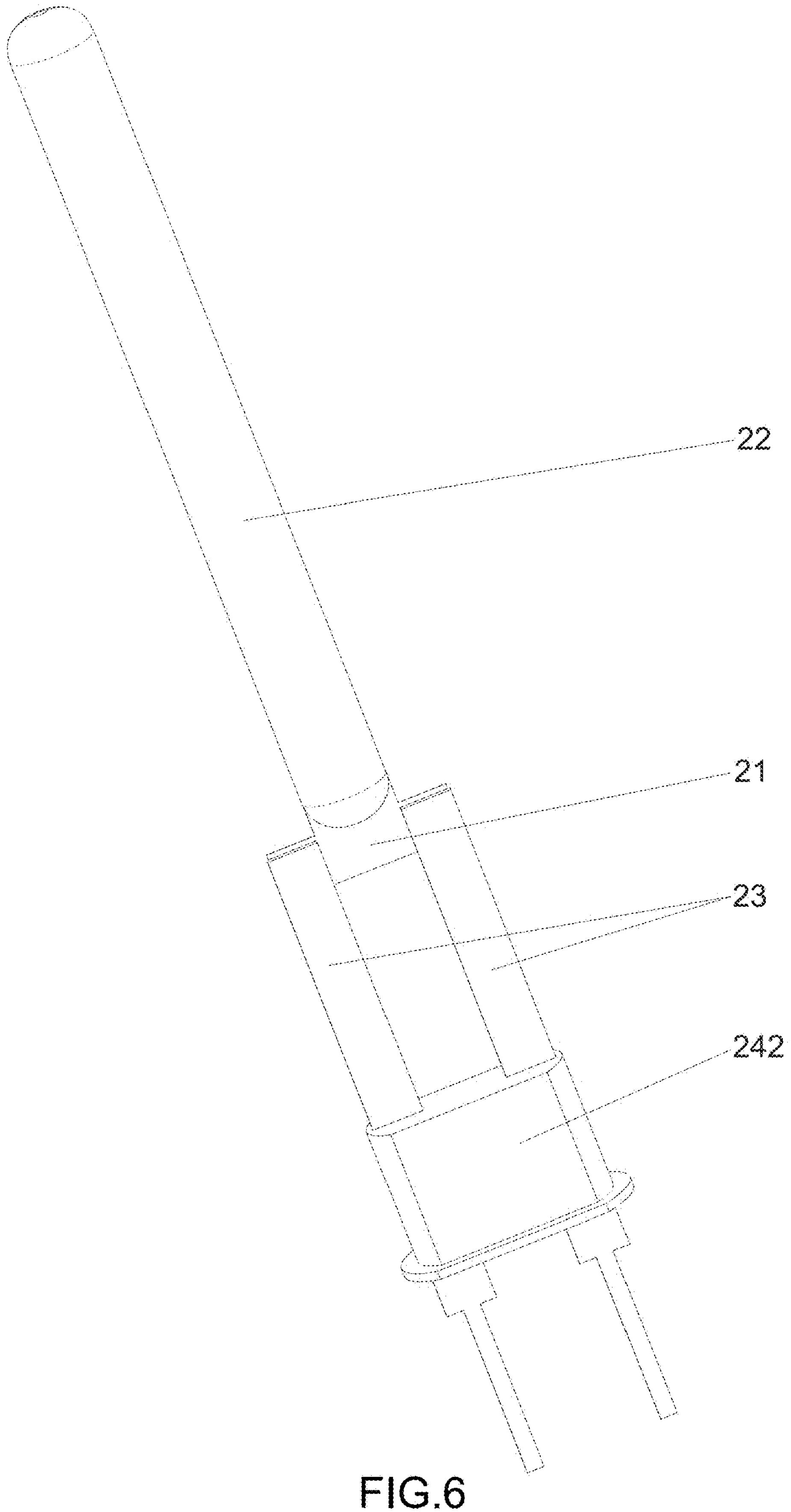
FIG. 6 is the structural diagram for an LED filament of the invention with a protection part removed.

1. Lampshade; 11. Perforating hole; 12. External thread; 2. LED filament; 21. Substrate; 22. Packaging layer; 23. Conductive filament; 24. Display positioning block; 241. Protection part; 242. Positioning part; 243. Second convex block; 3. Lamp cap; 31. Internal thread; 4. Positioning seat; 41. Central part; 411. Positioning hole; 42. Support strip; 43. Baffle plate; 44. Heat dissipation hole; 45. First convex block; 46. Anti-slip raised strip; 5. Decorative modeling part; 51. Decorative part; 52. Fixing part; 53. Inner cavity; 54. Opening; 55. Clamping slot

DESCRIPTION OF EMBODIMENTS

The embodiments of the invention are specifically described below in combination with the drawings.

Embodiment 1

As shown in FIG. 1 to FIG. 6, an improved novel LED lamp comprises a lampshade 1, an LED filament 2, a lamp cap 3 and a positioning seat 4.

As shown in FIG. 2 to FIG. 6, the LED filament 2 comprises a substrate 21, an LED light source (not shown in the drawings), a packaging layer 22, two conductive parts (not shown in the drawings), two conductive filaments 23 and a display positioning block 24; the LED light source is arranged on the surface of the substrate 21, and the packaging layers 22 covered on the LED light source are packaged on both surfaces of the substrate 21; the two conductive parts are respectively arranged at the lower end of one surface of the substrate 21 and electrically connected with the LED light source; the upper ends of the two conductive filaments 23 are respectively connected to the two conductive parts by welding. Therefore, the electrical connection between the conductive filaments 23 and the LED light source can be realized by the conductive parts.

As shown in FIG. 2 to FIG. 5, for the two conductive filaments 23, the middle and upper ends of the two conductive filaments 23 and the lower ends of the substrate 21 and two conductive parts are covered by the injection-molded display positioning block 24, and the display positioning block 24 is extended upward near the bottom of the packaging layer 22, so that the middle and upper ends of the two conductive filaments 23 are not easily bent and deformed and the stability thereof is improved; the display positioning block can be used to prevent electric shock, and the upper end surface thereof can be used for printing patterns or logos.

As shown in FIG. 2 to FIG. 5, the positioning seat 4 is installed in the perforating hole 11 at the lower end of the lampshade 1; in addition, a positioning hole 411 penetrating up and down is arranged in the middle of the positioning seat 4; the lower end of the display positioning block 24 is clamped in the positioning hole 411 in a matchable way to position the LED filament 2 and avoiding loosening; moreover, the lower ends of the two conductive filaments 23 pass down through the positioning holes 411.

As shown in FIG. 2 to FIG. 5, the lamp cap 3 is sleeved outside the perforating hole 11 at the lower end of the lamp cap 1 and is respectively connected with the lower ends of the two conductive filaments 23. Therefore, after the lamp cap 3 is connected with an external power supply, two conductive filaments 23 and the conductive parts can be used to supply power to the LED light source. Since the connecting structure between the lamp cap 3 and the two conductive filaments 23 is the prior art, it is not further detailed here.

As shown in FIG. 2 to FIG. 5, in the embodiment, an interference fit between the lower end of the display positioning block 24 and the positioning hole 411 can facilitate the assembly of the display positioning block 24, improve the assembly efficiency and, of course, facilitate disassembly.

As shown in FIG. 2 to FIG. 5, in the embodiment, the display positioning block 24 comprises a protection part 241 located at the top and a positioning part 242 located at the bottom; the protection part 241 and the positioning part 242 are flat, and the thickness of the positioning part 242 is greater than that of the protection part 241; the positioning part 242 can be used for interference fit with the positioning hole 411, and the outer surface of the protection part 241 can be used for printing patterns or logos.

In the embodiment, the display positioning block 24 is made of insulating material.

As shown in FIG. 2 to FIG. 5, in the embodiment, the outer surfaces around the positioning part 242 and the sides around the positioning hole 411 are two planes and two arc-shaped surfaces connected successively at intervals, so that the connection between the positioning part 242 and the positioning hole 411 is very stable, and the positioning part 242 does not easily rotate in the positioning hole 411.

As shown in FIG. 2 to FIG. 5, in the embodiment, the positioning seat 4 comprises a central part 41 located in the middle and provided with the positioning hole 411 in the center, a plurality of support strips 42 radially connected on the outer surface around the central part 41 and a baffle plate 43 respectively connected with the outer ends of a plurality of support strips 42; heat dissipation holes 44 penetrating up and down are formed between the two adjacent support strips 42. Through the above arrangement, the positioning seat 4 can be connected with the display positioning block 24 by using the central part 41, and the heat dissipation hole 44 can improve the heat dissipation efficiency of the LED filament 2 and then extend the service life of the LED filament 2 to a certain extent.

As shown in FIG. 2 to FIG. 5, in the embodiment, a first convex block 45 for matching with the bottom surface of the lampshade 1 is extended outward around the bottom of the baffle plate; the first convex block 45 is affixed to the bottom surface of the lampshade 1 when the positioning seat is installed in the perforating hole 11 at the lower end of the lampshade in a matchable way. Therefore, by arranging the first convex block 45, the positioning seat 4 can be limited by the first convex block 45 during the installation process to prevent the positioning seat 4 from exceeding the predetermined travel. For example, when the positioning seat 4 is pushed upward in the perforating hole 11, the positioning seat 4 is installed in place until the first convex block 45 is butted against the bottom surface of the lampshade 1.

As shown in FIG. 2 to FIG. 5, in the embodiment, a second convex block 243 for matching with the bottom surface of the central part 41 is extended outward around the bottom of the positioning part 242; the second convex block 243 is affixed to the bottom surface of the central part 41 when the lower end of the display positioning block 24 is clamped in the positioning hole 411 in a matchable way. Similarly, by arranging the second convex block 243, the display positioning block 24 can be limited by the second convex block 243 during installation to prevent the display positioning block 24 from exceeding the predetermined travel. For example, when the display positioning block 24 is pushed upward in the positioning hole 411, the display positioning block 24 is installed in place until the second convex block 243 is butted against the bottom surface of the positioning part 242.

As shown in FIG. 2 to FIG. 5, in the embodiment, a plurality of uniformly distributed anti-slip raised strips 46 are arranged on the outer surfaces around the positioning seat 4 so that the positioning seat 4 can be installed in the perforating hole 11 at the lower end of the lampshade 1 by interference fit. Specifically, the anti-slip raised strips 46 are arranged on the outer surfaces around the baffle plate 43. The anti-slip raised strips 46 can ensure the connection stability between the positioning seat 4 and the lampshade 1.

As shown in FIG. 2 to FIG. 5, in the embodiment, an external thread 12 surrounding the perforating hole 11 is arranged around the lower end of the lampshade 1, and an internal thread 31 corresponding to the external thread 12 is arranged in the lamp cap 3, so that a threaded connection can be realized between the lamp cap 3 and the lampshade 1, and the lamp cap 3 can be easily disassembled.

The invention also comprises a resistor (not shown in the drawings); the resistor is connected to one conductive filament 23 and covered by the display positioning block 24. In the embodiment, the resistor is located in the positioning part 242. Since the resistor is arranged on the conductive filament 23 in the prior art, it is not further described here.

In the embodiment, the packaging layer 22 comprises a fluorescent powder material, which emits uniform light when excited by the light emitted by the LED light source. In addition, the surface of the packaging layer 22 is arc-shaped, which allows the light to be diverged more evenly.

In the embodiment, the lampshade 1 is made of clear plastic.

During assembly, first of all, correspondingly install the positioning seat 4 in the perforating hole 11 of the lampshade 1 until the first convex block 45 is connected with the bottom surface of the lampshade 1; next, insert the injection-molded LED filament 2 into the positioning hole 411 until the second convex block 243 is connected with the bottom surface of the central part 41; next, install the lamp cap 3.

To sum up, the display positioning block 24 is extended upward to the position near the bottom of the packaging layer 22, so that the middle and upper ends of the conductive filaments 23 can be completely covered, i.e., the conductive filaments 23 cannot be exposed above the display positioning block 24. This design can ensure the stability of the conductive filaments 23 covered by the display positioning block 24, prevent deformation and bending, and facilitate use and transport. In addition, the upper end of the display positioning block 24 can also be used for printing corresponding patterns, such as logos or other markings, etc., in order to promote the brand or improve the aesthetics. Off course, the display positioning block 24 also has the effect of preventing electric shock when people touch.

In addition, as the display positioning block 24 of the LED filament 2 is detachably installed in the positioning hole 411 of the positioning seat 4, the LED filament 2 or positioning seat 4 can be replaced separately without affecting other components when damaged; moreover, when the lampshade 1 with the perforating hole 11 of different size needs replacing, the user only needs to directly replace the positioning seat 4 with different external diameter, but the size of the positioning hole 41 on each positioning seat 4 needs to be unchanged, i.e., the LED filament 2 does not need replacing, so that the unreplaced LED filament 2 can be continuously used on the new positioning seat 4. This design can reduce the replacement and use costs of the lamp to a certain extent.

Embodiment 2

As shown in FIG. 5 to FIG. 9, an improved novel LED lamp comprises a lampshade 1, an LED filament 2, a lamp cap 3, a positioning seat 4 and a decorative modeling part 5.

Figure 7:
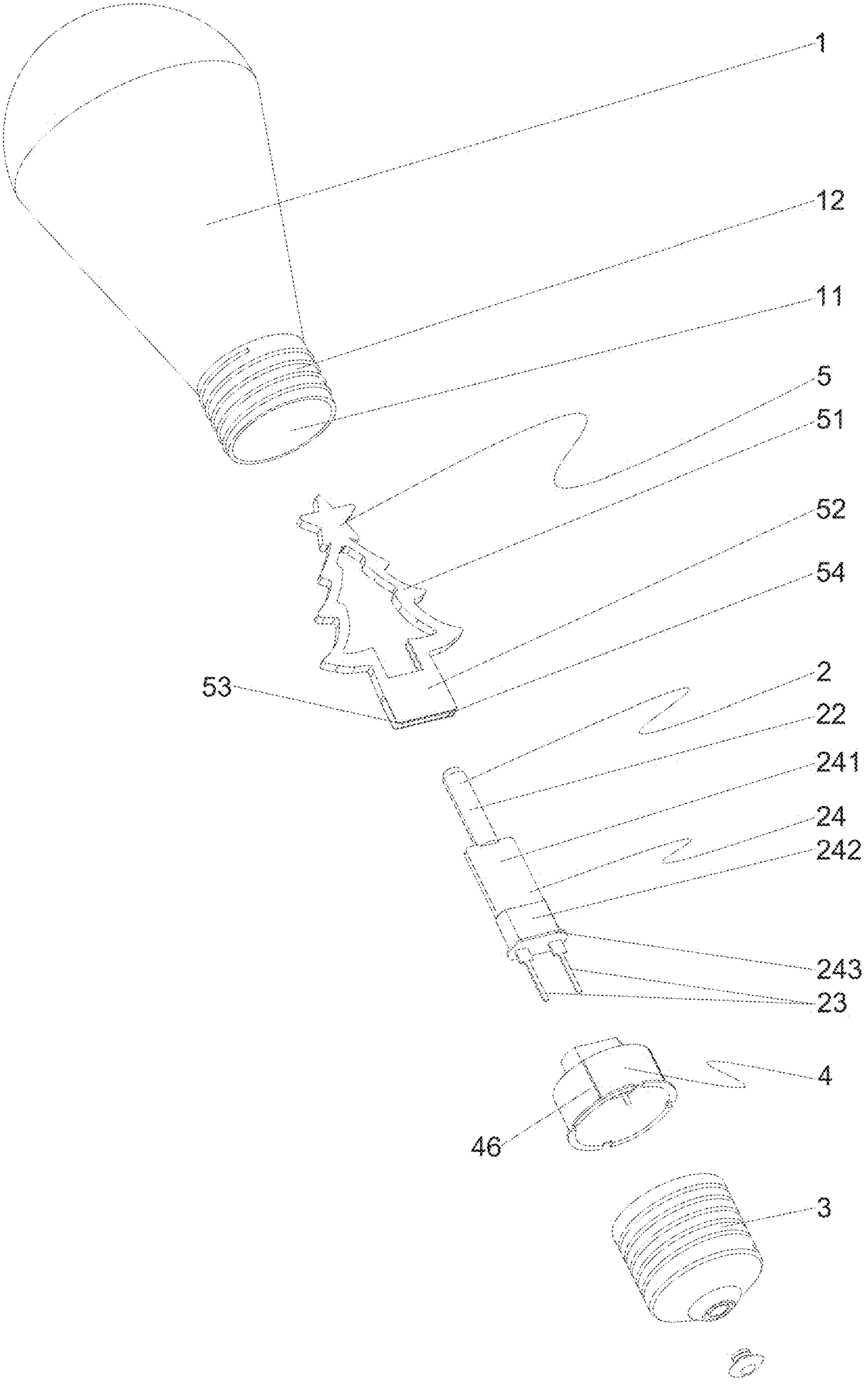
FIG. 7 is the explosive view 1 of Embodiment 2 in the invention.
Figure 8:
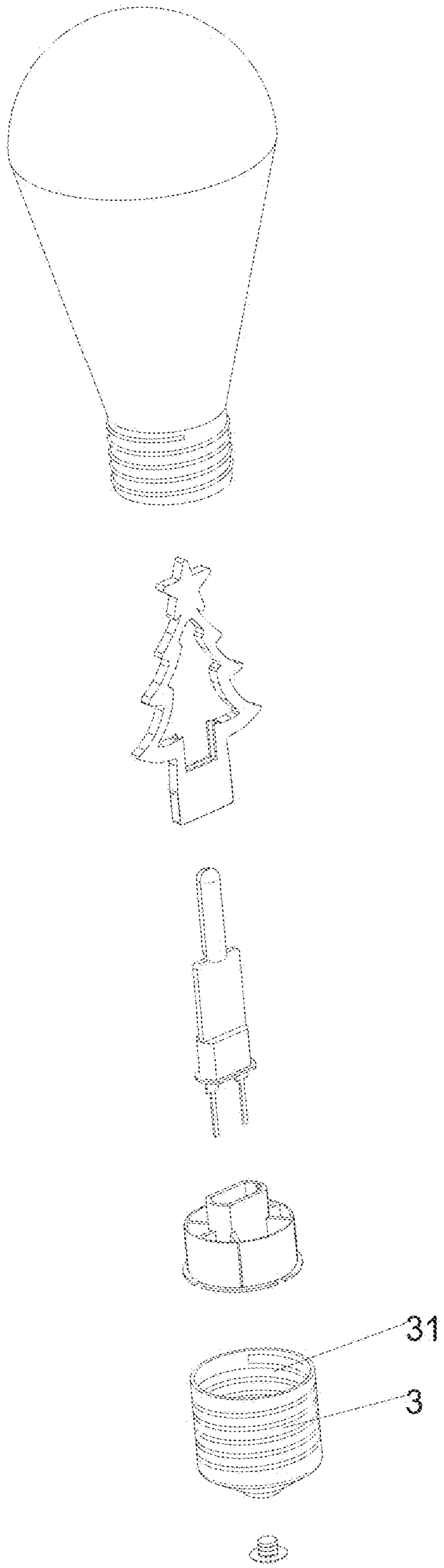
FIG. 8 is the explosive view 2 of Embodiment 2 in the invention.
Figure 9:
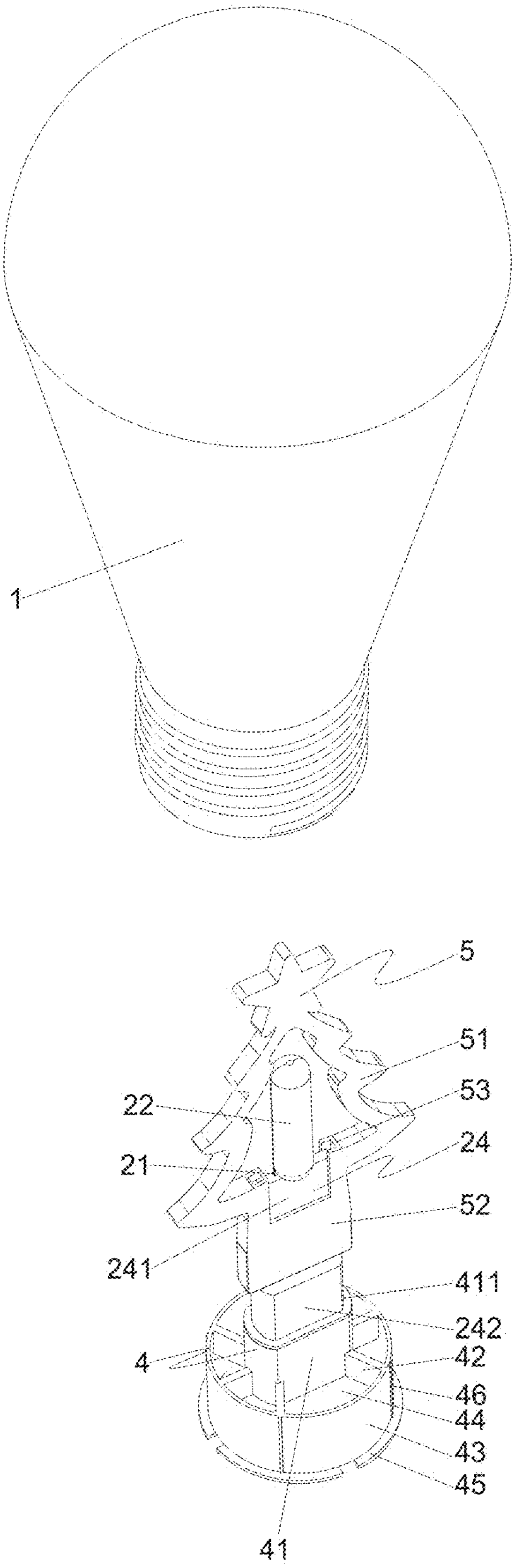
FIG. 9 is the local structural diagram of Embodiment 2 in the invention.

As shown in FIG. 7 to FIG. 9, the LED filament 2 comprises a substrate 21, an LED light source (not shown in the drawings), a packaging layer 22, two conductive parts (not shown in the drawings), two conductive filaments 23 and a display positioning block 24; the LED light source is arranged on the surface of the substrate 21, and the packaging layers 22 covered on the LED light source are packaged on both surfaces of the substrate 21; the two conductive parts are respectively arranged at the lower end of one surface of the substrate 21 and electrically connected with the LED light source; the upper ends of the two conductive filaments 23 are respectively connected to the two conductive parts by welding. Therefore, the electrical connection between the conductive filaments 23 and the LED light source can be realized by the conductive parts.

As shown in FIG. 7 to FIG. 9, for the two conductive filaments 23, the middle and upper ends of the two conductive filaments 23 and the lower ends of the substrate 21 and two conductive parts are covered by the injection-molded display positioning block 24, and the display positioning block 24 is extended upward near the bottom of the packaging layer 22, so that the middle and upper ends of the two conductive filaments 23 are not easily bent and deformed and the stability thereof is improved.

As shown in FIG. 7 to FIG. 9, the decorative modeling part 5 comprises a decorative part 51 and a fixing part 52 successively connected; the fixing part 52 can be installed on the display positioning block 24 to position the decorative modeling part 5; the decorative part 51 can be used to play a decorative role, so that the decorative part 51 of different shapes can be installed in the production process to show different ornamental feelings and a high degree of fun and create a different holiday atmosphere.

As shown in FIG. 7 to FIG. 9, the positioning seat 4 is installed in the perforating hole 11 at the lower end of the lampshade 1; in addition, a positioning hole 411 penetrating up and down is arranged in the middle of the positioning seat 4; the lower end of the display positioning block 24 is clamped in the positioning hole 411 in a matchable way to position the LED filament 2 and avoiding loosening; moreover, the lower ends of the two conductive filaments 23 pass down through the positioning holes 411.

As shown in FIG. 7 to FIG. 9, the lamp cap 3 is sleeved outside the perforating hole 11 at the lower end of the lamp cap 1 and is respectively connected with the lower ends of the two conductive filaments 23. Therefore, after the lamp cap 3 is connected with an external power supply, two conductive filaments 23 and the conductive parts can be used to supply power to the LED light source. Since the connecting structure between the lamp cap 3 and the two conductive filaments 23 is the prior art, it is not further detailed here.

in the embodiment, the decorative part 51 and the fixing part 52 can be connected successively. In addition, the LED light source and the packaging layer 22 pass through the decorative part 51.

Preferably, to ensure the diversity of the decorative modeling part 5, the appearance of the decorative part 51 can be animal, plant, number or English letter. However, in the embodiment, the appearance of the decorative part 51 is hollow Christmas tree, so that the light can be emitted directly from the center of the Christmas tree.

It should be noted that if the decorative part 51 is in the shape of animals such as duck, the LED light source and the packaging layer 22 can be appropriately lengthened in order to ensure the illumination effect, so that the upper end of the LED light source and the packaging layer 22 can pass through the top of the decorative part 51, so as to ensure that the light can be irradiated smoothly.

Of course, in other designs, the decorative part 51 can also be directly arranged on the side of the fixing part 52, so that the decorative part 51 does not affect the outward irradiation of the light as the decorative part 51 is located on the side of the light source after the decorative modeling part 5 is positioned.

As shown in FIG. 7 to FIG. 9, in the embodiment, an inner cavity 53 corresponding to the display positioning block 24 is arranged inside the fixing part 52, and a penetrating opening 54 is arranged at the lower end of the inner cavity 53, so that the fixing part 52 can be sleeved on the display positioning block 24 from top to bottom through the inner cavity 53, forming a clamping structure. Therefore, the above arrangement can facilitate the installation of the decorative modeling part 5. Specifically, in the installation, just directly sleeve the fixing part 52 on the display positioning block 24 to position the decorative modeling part 5.

In the embodiment, an interference fit between the lower end of the display positioning block 24 and the positioning hole 411 can facilitate the assembly of the display positioning block 24, improve the assembly efficiency and, of course, facilitate disassembly.

As shown in FIG. 5 to FIG. 9, in the embodiment, the display positioning block 24 comprises a protection part 241 located at the top and a positioning part 242 located at the bottom; the protection part 241 and the positioning part 242 are flat, and the thickness of the positioning part 242 is greater than that of the protection part 241; the protection part 241 can be used for clamping with a fixing part 52, and the bottom surface of the fixing part 52 can be butted against the top surface of the positioning part 242 to complete the positioning of the decorative modeling part 5; the positioning part 242 can be used for interference fit with the positioning hole 411. Thus, in the technical proposal of the embodiment, the display positioning block 24 is used for protecting the conductive filaments 23 and positioning the decorative modeling part 5, but is not used for printing patterns or logos.

In the embodiment, the display positioning block 24 is made of insulating material.

As shown in FIG. 5 to FIG. 9, in the embodiment, the outer surfaces around the positioning part 242 and the sides around the positioning hole 411 are two planes and two arc-shaped surfaces connected successively at intervals, so that the connection between the positioning part 242 and the positioning hole 411 is very stable, and the positioning part 242 does not easily rotate in the positioning hole 411.

As shown in FIG. 5 to FIG. 9, in the embodiment, the positioning seat 4 comprises a central part 41 located in the middle and provided with the positioning hole 411 in the center, a plurality of support strips 42 radially connected on the outer surface around the central part 41 and a baffle plate 43 respectively connected with the outer ends of a plurality of support strips 42; heat dissipation holes 44 penetrating up and down are formed between the two adjacent support strips 42. Through the above arrangement, the positioning seat 4 can be connected with the display positioning block 24 by using the central part 41, and the heat dissipation hole 44 can improve the heat dissipation efficiency of the LED filament 2 and then extend the service life of the LED filament 2 to a certain extent.

As shown in FIG. 5 to FIG. 9, in the embodiment, a first convex block 45 for matching with the bottom surface of the lampshade 1 is extended outward around the bottom of the baffle plate; the first convex block 45 is affixed to the bottom surface of the lampshade 1 when the positioning seat is installed in the perforating hole 11 at the lower end of the lampshade in a matchable way. Therefore, through the above arrangement, the positioning seat 4 can be connected with the display positioning block 24 by using the central part 41, and the heat dissipation hole 44 can improve the heat dissipation efficiency of the LED filament 2 and then extend the service life of the LED filament 2 to a certain extent.

As shown in FIG. 5 to FIG. 9, in the embodiment, a second convex block 243 for matching with the bottom surface of the central part 41 is extended outward around the bottom of the positioning part 242; the second convex block 243 is affixed to the bottom surface of the central part 41 when the positioning part 242 is clamped in the positioning hole 411 in a matchable way. Similarly, by arranging the second convex block 243, the display positioning block 24 can be limited by the second convex block 243 during installation to prevent the display positioning block 24 from exceeding the predetermined travel. For example, when the display positioning block 24 is pushed upward in the positioning hole 411, the display positioning block 24 is installed in place until the second convex block 243 is butted against the bottom surface of the central part 41.

As shown in FIG. 8, a plurality of uniformly distributed anti-slip raised strips 46 are arranged on the outer surfaces around the positioning seat 4 so that the positioning seat 4 can be installed in the perforating hole 11 at the lower end of the lampshade 1 by interference fit. Specifically, the anti-slip raised strips 46 are arranged on the outer surfaces around the baffle plate 43. The anti-slip raised strips 46 can ensure the connection stability between the positioning seat 4 and the lampshade 1.

As shown in FIG. 7, an external thread 12 surrounding the perforating hole 11 is arranged around the lower end of the lampshade 1, and an internal thread 31 corresponding to the external thread 12 is arranged in the lamp cap 3, so that a threaded connection can be realized between the lamp cap 3 and the lampshade 1.

The invention also comprises a resistor (not shown in the drawings); the resistor is connected to one conductive filament 23 and covered by the display positioning block 24.

In the embodiment, the packaging layer 22 also comprises a fluorescent powder material, which emits uniform light when excited by the light emitted by the LED light source. In addition, the surface of the packaging layer 22 is arc-shaped, which allows the light to be diverged more evenly.

In the embodiment, the lampshade 1 is also made of clear plastic.

During assembly, first of all, upward insert the LED filament 2 of the injection-molded display positioning block 24 into the positioning hole 411 until the second convex block 243 is butted against the bottom surface of the central part 41; next, sleeve the fixing part 52 of the decorative modeling part 5 directly on the protective part 241 from top to bottom to position the decorative modeling part 5; next, install the positioning seat 4 in the port 11 of the lampshade 1 accordingly until the first convex block 45 is butted against the bottom surface of the lampshade 1; next, install the lamp cap 3.

To sum up, the decorative modeling part 5 is also arranged on the display positioning block 24 in the invention, so that the lamp can create different decorative effects in the production process by installing the decorative modeling parts 5 of different shapes, and then create different holiday atmospheres to meet the purchase needs of different groups of people. Of course, the display positioning block 24 is extended upward to the position near the bottom of the packaging layer 22, so that the middle and upper ends of the conductive filaments 23 can be completely covered, i.e., the conductive filaments 23 cannot be exposed above the display positioning block 24. This design can ensure the stability of the conductive filaments 23 covered by the display positioning block 24, prevent deformation and bending, and facilitate use and transport. In addition, the display positioning block 24 also has the effect of preventing electric shock when people touch.

Embodiment 3

Figure 10:
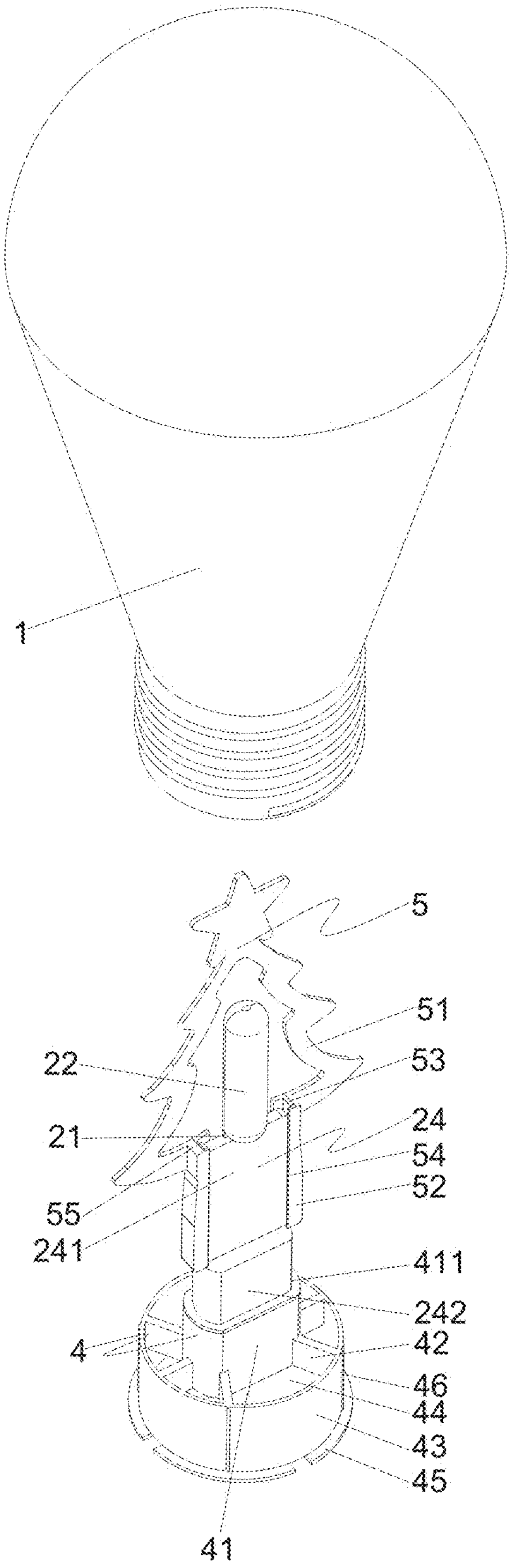
FIG. 10 is the local structure diagram of Embodiment 3 in the invention.

As shown in FIG. 10, the embodiment differs from Embodiment 2 in that, in the embodiment, an inner cavity 53 corresponding to the display positioning block 24 is arranged inside the fixing part 52, an opening 54 running through the upper and lower ends of the fixing part 52 is arranged on one side of the inner cavity 53; the width of the opening 54 is less than that of the fixing part 52 to form clamping slots 55 respectively on the two inner sides of the fixing part 52; the fixed part 52 can be sleeved horizontally on the display positioning block 24 through the opening 54, and the two sides of the display positioning block 24 are respectively clamped by two clamping slots 55 to form a clamping structure. Therefore, in the embodiment, the fixing part 52 is not a vertical installation structure sleeved on the protection part 241 from top to bottom, but the horizontal installation method is adopted. When the fixing part 52 is clamped between the two clamping slots 55, the bottom surface of the fixing part 52 is butted against the top surface of the positioning part 242 to position the decorative modeling part 5. Of course, the decorative modeling part 5 is preferably made of plastic with certain hardness to ensure that the two clamping slots 55 can stably clamp the fixing part 52 without loosening. In addition, the display positioning block 24 in the embodiment basically has the same function as that in Embodiment 2, but differs in the installation method.

The scope of the invention is not defined by the embodiments described above, but by the appended claims and their equivalents.

What is claimed is:

1. An improved novel LED lamp, characterized by comprising a lampshade, an LED filament, a lamp cap and a positioning seat;

the LED filament comprises a substrate, an LED light source, packaging layers, two conductive parts, two conductive filaments and a display positioning block; the LED light source is arranged on the surface of the substrate, and the packaging layers covered on the LED light source is arranged on both surfaces of the substrate; the two conductive parts are respectively arranged at the lower end of one surface of the substrate and electrically connected with the LED light source; the upper ends of the two conductive filaments are respectively connected with the two conductive parts;

the middle and upper ends of the two conductive filaments and the lower ends of the substrate and the two conductive parts are covered by the injection-molded display positioning block, and the display positioning block is extended upward to a position near the bottom of the packaging layer, so that the middle and upper ends of the two conductive filaments are not easily bent and deformed, and the stability thereof is improved; the display positioning block can be used to prevent electric shock, and the upper end surface thereof can be used for printing patterns or logos;

the positioning seat is installed in a perforating hole at the lower end of the lampshade; a positioning hole penetrating up and down is arranged in the middle of the positioning seat; the lower end of the display positioning block is clamped in the positioning hole in a matchable way to position the LED filament; the lower ends of the two conductive filaments pass down through the positioning holes;

the lamp cap is sleeved outside the perforating hole at the lower end of the lampshade and is respectively connected with the lower ends of the two conductive filaments.

2. The improved novel LED lamp according to claim 1, characterized in that the display positioning block comprises a protection part located at the top and a positioning part located at the bottom; the protection part and the positioning part are flat, and the thickness of the positioning part is greater than that of the protection part; the protection part can be used for clamping with a fixing part, and the bottom surface of the fixing part can be butted against the positioning part; the positioning part can be used for interference fit with the positioning hole, and the protection part can be used for printing patterns or logos.

3. The improved novel LED lamp according to claim 2, characterized in that the outer surfaces around the positioning part and the sides around the positioning hole are two planes and two arc-shaped surfaces connected successively at intervals.

4. The improved novel LED lamp according to claim 2, characterized in that the positioning seat comprises a central part located in the middle and provided with the positioning hole in the center, a plurality of support strips radially connected on the outer surface around the central part and a baffle plate respectively connected with the outer ends of a plurality of support strips; heat dissipation holes penetrating up and down are formed between the two adjacent support strips.

5. The improved novel LED lamp according to claim 4, characterized in that a first convex block for matching with the bottom surface of the lampshade is extended outward around the bottom of the baffle plate; the first convex block is affixed to the bottom surface of the lampshade when the positioning seat is installed in the perforating hole at the lower end of the lampshade in a matchable way.

6. The improved novel LED lamp according to claim 4, characterized in that a second convex block for matching with the bottom surface of the central part is extended outward around the bottom of the positioning part; the second convex block is affixed to the bottom surface of the central part when the positioning part is clamped in the positioning hole in a matchable way.

7. The improved novel LED lamp according to claim 1, characterized in that a plurality of uniformly distributed anti-slip raised strips are arranged on the outer surfaces around the positioning seat so that the positioning seat can be installed in the perforating hole at the lower end of the lampshade by interference fit.

8. The improved novel LED lamp according to claim 1, characterized in that an external thread surrounding the perforating hole is arranged around the lower end of the lampshade, and an internal thread corresponding to the external thread is arranged in the lamp cap, so that a threaded connection can be realized between the lamp cap and the lampshade.

9. The improved novel LED lamp according to claim 1, characterized by also comprising a resistor; the resistor is connected to one conductive filament and covered by the display positioning block.

10. An improved novel LED lamp, characterized by also comprising a lampshade, an LED filament, a lamp cap, a positioning seat and a decorative modeling part;

the LED filament comprises a substrate, an LED light source, packaging layers, two conductive parts, two conductive filaments and a display positioning block; the LED light source is arranged on the surface of the substrate, and the packaging layers covered on the LED light source is arranged on both surfaces of the substrate; the two conductive parts are respectively arranged at the lower end of one surface of the substrate and electrically connected with the LED light source; the upper ends of the two conductive filaments are respectively connected with the two conductive parts;

the middle and upper ends of the two conductive filaments and the lower ends of the substrate and the two conductive parts are covered by the injection-molded display positioning block, and the display positioning block is extended upward to a position near the bottom of the packaging layer, so that the middle and upper ends of the two conductive filaments are not easily bent and deformed, and the stability thereof is improved;

the decorative modeling part comprises a decorative part and a fixing part successively connected; the fixing part can be installed on the display positioning block to position the decorative modeling part; the decorative part can be used to play a decorative role;

the positioning seat is installed in a perforating hole at the lower end of the lampshade; a positioning hole penetrating up and down is arranged in the middle of the positioning seat; the lower end of the display positioning block is clamped in the positioning hole in a matchable way to position the LED filament; the lower ends of the two conductive filaments pass down through the positioning holes;

the lamp cap is sleeved outside the perforating hole at the lower end of the lampshade and is respectively connected with the lower ends of the two conductive filaments.

11. The improved novel LED lamp according to claim 10, characterized in that an inner cavity corresponding to the display positioning block is arranged inside the fixing part, and a penetrating opening is arranged at the lower end of the inner cavity, so that the fixing part can be sleeved on the display positioning block from top to bottom through the inner cavity, forming a clamping structure.

12. The improved novel LED lamp according to claim 10, characterized in that an inner cavity corresponding to the display positioning block is arranged inside the fixing part, and an opening running through the upper and lower ends of the fixing part is arranged on one side of the inner cavity; the width of the opening is less than the width of the fixing part so as to form clamping slots respectively on two inner sides of the fixing part; the fixing part can be sleeved horizontally on the display positioning block through the opening, and both sides of the display positioning block are respectively clamped by the two clamping slots to form a clamping structure.

13. The improved novel LED lamp according to claim 11, characterized in that the display positioning block comprises a protection part located at the top and a positioning part located at the bottom; the protection part and the positioning part are flat, and the thickness of the positioning part is greater than that of the protection part; the protection part can be used for clamping with a fixing part, and the bottom surface of the fixing part can be butted against the positioning part; the positioning part can be used for interference fit with the positioning hole.

14. The improved novel LED lamp according to claim 13, characterized in that the outer surfaces around the positioning part and the sides around the positioning hole are two planes and two arc-shaped surfaces connected successively at intervals.

15. The improved novel LED lamp according to claim 13, characterized in that the positioning seat comprises a central part located in the middle and provided with the positioning hole in the center, a plurality of support strips radially connected on the outer surface around the central part and a baffle plate respectively connected with the outer ends of a plurality of support strips; heat dissipation holes penetrating up and down are formed between the two adjacent support strips.

16. The improved novel LED lamp according to claim 15, characterized in that a first convex block for matching with the bottom surface of the lampshade is extended outward around the bottom of the baffle plate; the first convex block is affixed to the bottom surface of the lampshade when the positioning seat is installed in the perforating hole at the lower end of the lampshade in a matchable way.

17. The improved novel LED lamp according to claim 15, characterized in that a second convex block for matching with the bottom surface of the central part is extended outward around the bottom of the positioning part; the second convex block is affixed to the bottom surface of the central part when the positioning part is clamped in the positioning hole in a matchable way.

18. The improved novel LED lamp according to claim 10, characterized in that a plurality of uniformly distributed anti-slip raised strips are arranged on the outer surfaces around the positioning seat so that the positioning seat can be installed in the perforating hole at the lower end of the lampshade by interference fit.

19. The improved novel LED lamp according to claim 10, characterized in that the LED light source and the packaging layer are arranged in the decorative part or on one side of the decorative part.

20. The improved novel LED lamp according to claim 10, characterized in that the appearance of the decorative part can be animal, plant, number or English letter.

* * * * *